(12) United States Patent
Berggren

(10) Patent No.: US 10,546,501 B2
(45) Date of Patent: Jan. 28, 2020

(54) METHOD AND APPARATUS FOR FLEET MANAGEMENT OF EQUIPMENT

(71) Applicant: Magnus Berggren, San Diego, CA (US)

(72) Inventor: Magnus Berggren, San Diego, CA (US)

(*) Notice: Subject to any disclaimer, the term of this patent is extended or adjusted under 35 U.S.C. 154(b) by 0 days.

(21) Appl. No.: 15/485,185

(22) Filed: Apr. 11, 2017

(65) Prior Publication Data

US 2018/0033311 A1 Feb. 1, 2018

Related U.S. Application Data

(60) Provisional application No. 62/320,618, filed on Apr. 11, 2016.

(51) Int. Cl.
| | | |
|---|---|---|
| *G08G 1/00* | (2006.01) | |
| *H04L 29/08* | (2006.01) | |
| *G01S 19/01* | (2010.01) | |
| *G07C 5/00* | (2006.01) | |

(52) U.S. Cl.
CPC .............. *G08G 1/205* (2013.01); *G01S 19/01* (2013.01); *G07C 5/008* (2013.01); *H04L 67/02* (2013.01)

(58) Field of Classification Search
CPC ........ G08G 1/205; G08G 1/20; G08B 25/016; G01S 19/01; G07C 5/008; H04L 67/02
See application file for complete search history.

(56) References Cited

U.S. PATENT DOCUMENTS

| | | | |
|---|---|---|---|
| 5,454,743 A | 10/1995 | Simonson | |
| 6,313,438 B1* | 11/2001 | Emerick, Jr. | A47G 9/086 2/69 |
| 6,966,808 B1 | 11/2005 | Liao | |
| 7,433,805 B2 | 10/2008 | Vock et al. | |
| 8,880,239 B2* | 11/2014 | Kleve | B60R 25/24 701/2 |
| 9,045,202 B1 | 6/2015 | Alarcon et al. | |
| 9,080,736 B1* | 7/2015 | Salzinger | H05B 37/0218 |
| 9,210,534 B1* | 12/2015 | Matthieu | H04W 4/005 |
| 9,505,471 B2 | 11/2016 | Wunner | |
| 2004/0176000 A1 | 9/2004 | Mann | |
| 2005/0254778 A1 | 11/2005 | Pettersen et al. | |
| 2006/0109106 A1* | 5/2006 | Braun | G06Q 10/08 340/539.13 |
| 2007/0061107 A1* | 3/2007 | Vock | G01P 3/50 702/182 |
| 2007/0143207 A1* | 6/2007 | Breen | G06Q 20/102 705/40 |

(Continued)

*Primary Examiner* — Behrang Badii
*Assistant Examiner* — Daniel L Greene
(74) *Attorney, Agent, or Firm* — Mintz Levin Cohn Ferris Glovsky and Popeo, P.C.

(57) ABSTRACT

A system and method for tracking rental equipment such as fleet watercraft is disclosed. The system and method includes a communication system and a waterproof and weatherproof GPS tracking device that is easily attached to each watercraft and integrated into the communication system. The communication system further includes a client application running on a client computing tracking device. The client application can receive GPS tracking data from the GPS tracking device, interpret the data in various beneficial ways, and graphically display the interpreted data.

14 Claims, 19 Drawing Sheets

(56) References Cited

U.S. PATENT DOCUMENTS

| | | | |
|---|---|---|---|
| 2007/0262861 A1* | 11/2007 | Anderson | G06Q 10/025 340/539.13 |
| 2008/0186166 A1* | 8/2008 | Zhou | G01S 5/0027 340/539.13 |
| 2009/0042467 A1 | 2/2009 | Huang | |
| 2010/0006314 A1 | 1/2010 | Wilson, II et al. | |
| 2011/0238299 A1* | 9/2011 | Nguyen | G01C 21/3469 701/408 |
| 2011/0313937 A1* | 12/2011 | Moore, Jr. | G06Q 30/0645 705/307 |
| 2012/0262618 A1 | 10/2012 | Weakly | |
| 2013/0017743 A1 | 1/2013 | Green et al. | |
| 2013/0147617 A1* | 6/2013 | Boling | G08B 21/18 340/431 |
| 2013/0222260 A1 | 8/2013 | Tanase | |
| 2013/0346013 A1 | 12/2013 | Lokshin et al. | |
| 2014/0072278 A1 | 3/2014 | Kramer et al. | |
| 2014/0257743 A1 | 9/2014 | Lokshin et al. | |
| 2014/0357295 A1* | 12/2014 | Skomra | H04W 4/02 455/456.1 |
| 2014/0376758 A1* | 12/2014 | Barcel | H04R 1/023 381/334 |
| 2015/0070188 A1* | 3/2015 | Aramburu | A01G 25/167 340/870.02 |
| 2015/0194044 A1* | 7/2015 | Adams | G08B 21/0269 340/539.13 |
| 2016/0110976 A1* | 4/2016 | Mains, Jr. | G08B 13/2434 340/572.8 |
| 2016/0269530 A1* | 9/2016 | Berggren | H04M 1/72527 |

* cited by examiner

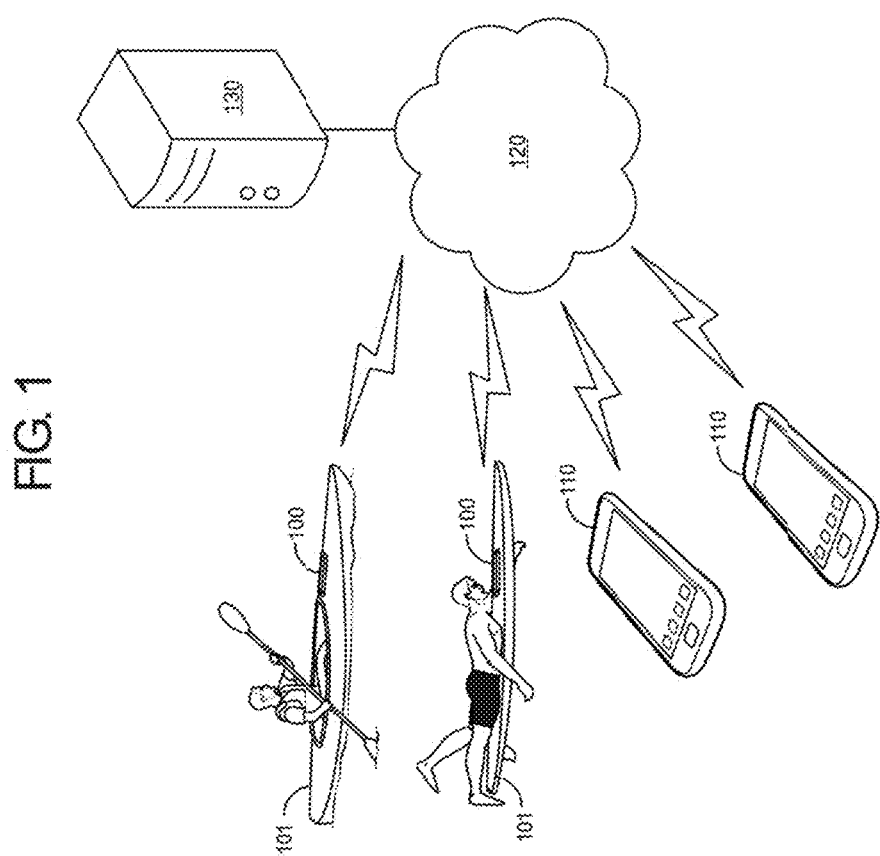

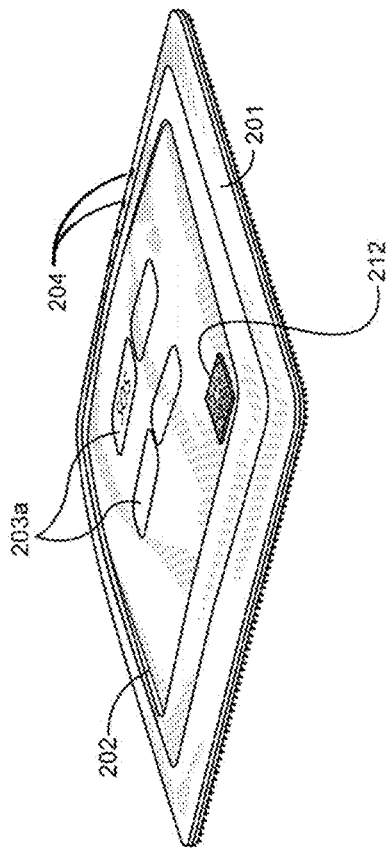
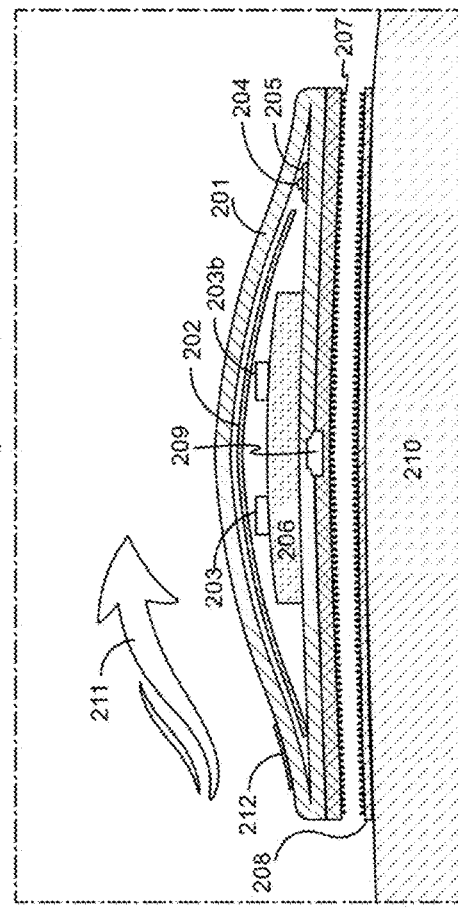
FIG. 2A
FIG. 2B

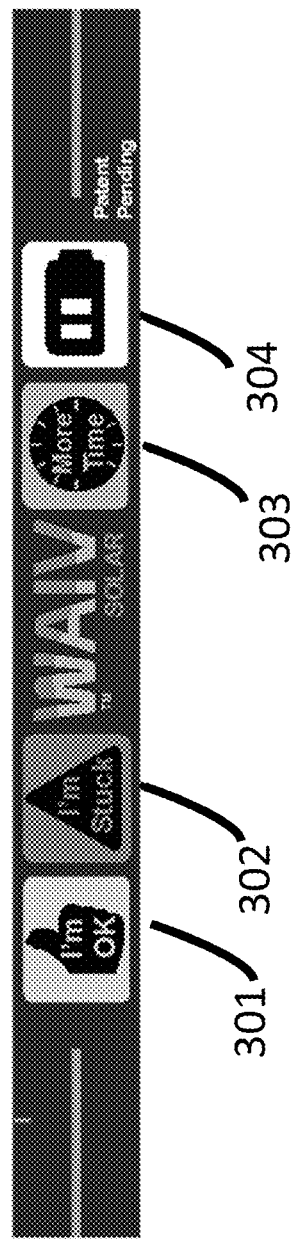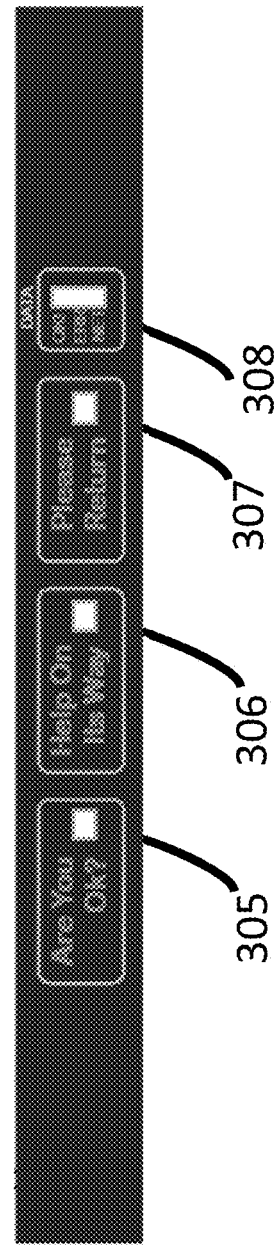
FIG. 3C
FIG. 3D

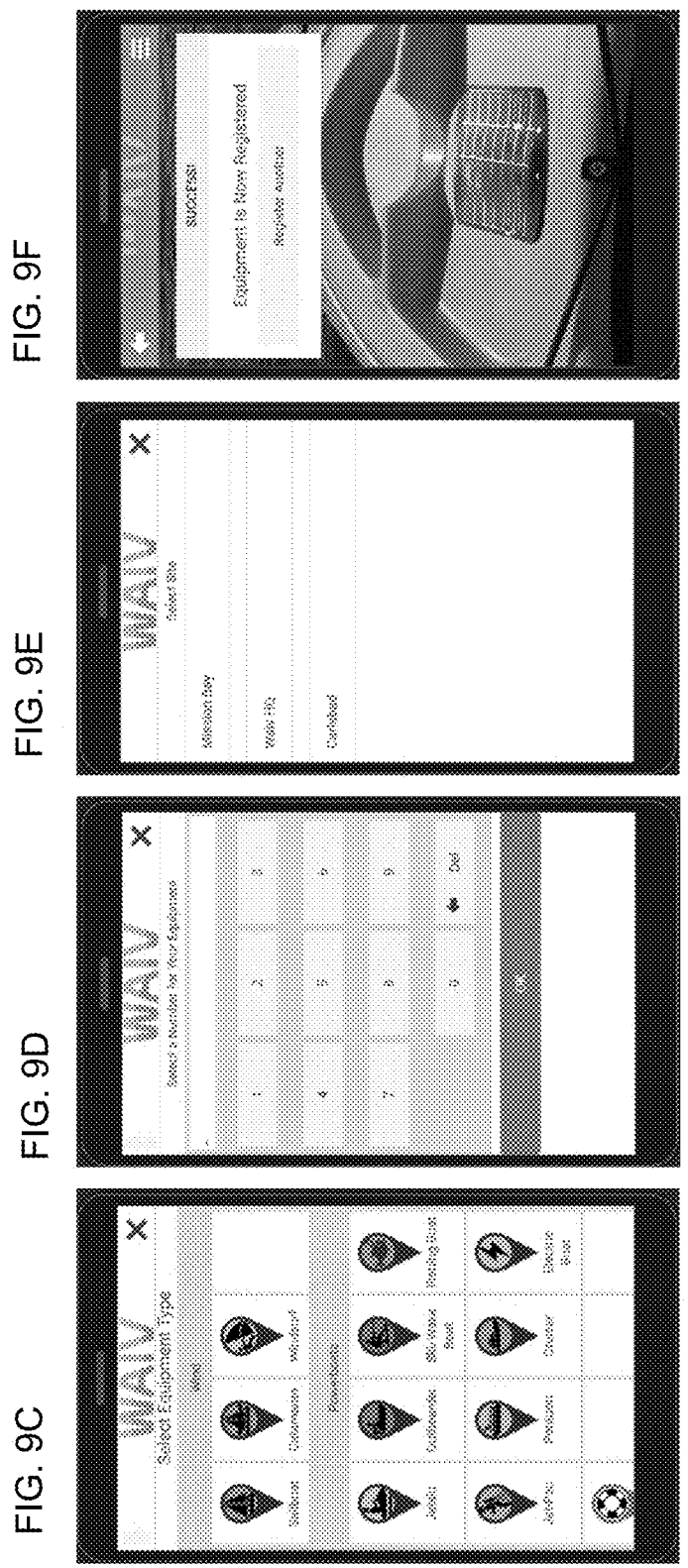

METHOD AND APPARATUS FOR FLEET MANAGEMENT OF EQUIPMENT

CROSS REFERENCE TO RELATED APPLICATIONS

This application claims priority to and the benefit of U.S. Provisional Patent Application No. 62/320,618 filed on Apr. 11, 2016, titled, "Wireless SOS Alert System and Location Tracker for Surfboards, Boats and Mobile Equipment", which is hereby incorporated by reference in its entirety.

BACKGROUND

The present invention relates to a GPS tracking and communication system for fleet management of equipment, and more particularly to a solar-powered, waterproof, weather proof GPS tracking device that communicates with a tracking and management application on a computing tracking device.

GPS tracking devices are well known, particularly in fleet management applications such as the trucking and shipping industries. GPS tracking enables tracking a geographical location of individual trucks or ships, for example, which in turn enables inventory management and logistical control of goods being conveyed on such transportation platforms.

But such GPS tracking systems for fleet management are usually expensive and difficult to maintain. Conventional GPS tracking systems are not tailored for certain types of rental equipment, such as water craft like jet-skis, sailboats, etc. Further, deployment of a GPS tracking system as described above is very complex and complicated. On the other end of the spectrum are GPS—enabled portable computers or "wearables"—computing tracking devices such as a watch or smartphone that can be worn by a user to track their geographical location. These personal GPS tracking systems are typically not scalable to track multiple different objects at the same time, nor do they interpret GPS data in a manner that benefits a fleet of such objects.

SUMMARY

This document describes a tracking and communication system for locating and managing a fleet of equipment. In some preferred implementations, the fleet of equipment includes rental watercraft. Examples of such watercraft include, but are not limited to, jet-skis, wave-runners, sailboats, catamarans, powerboats, cruisers, pontoons, rafts, kayaks, canoes, stand-up-paddleboards, pedal boats, surfboards, wakeboards and yachts. Accordingly, a tracking and communication system includes a waterproof and weatherproof GPS tracking device that is easily attached to each watercraft and integrated into the communication system. The communication system further includes a client application running on a client computing tracking device. The client application can receive GPS tracking data from the GPS tracking device, interpret the data in various beneficial ways, and display the interpreted data both graphically and alphanumerically. For instance, GPS tracking data can be interpreted to discern whether a renter of a boat is using the rented boat only within a proscribed area, or whether the renter has exceeded requisite geographical or time limits.

In some aspect, a system and method include using a tracking device for coupling with each of a plurality of rental equipment, the rental equipment being subject to a rental agreement that represents a duration and/or a geographical limitation for the rental equipment. The tracking device includes a flexible, waterproof outer enclosure having one or more solar panels for converting solar energy to electricity for the tracking device. The tracking device further includes a rigid inner enclosure housed by the flexible, waterproof outer enclosure, and a global positioning system (GPS) device embedded in the rigid inner enclosure and being powered by electricity from the one or more solar panels. The tracking device further includes a transceiver embedded in the rigid inner enclosure and being powered by electricity from the one or more solar panels, the transceiver for receiving and transmitting signals to and from a communication network, and logic circuitry embedded in the rigid inner enclosure and being powered by electricity from the one or more solar panels. The logic circuitry receives GPS data from the GPS device and sends the GPS data to the transceiver for transmitting by the transceiver to the communication network. A system and method further includes a server system executing a fleet management application, the server system receiving the GPS data from the tracking device via the communication network, and processing the GPS data to generate a set of analytical information to representing geographical data during the duration of the rental agreement.

The details of one or more implementations are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1 is a block diagram of a system overview;

FIG. 2A is a mechanical representation of a GPS tracking device;

FIG. 2B is a cross-sectional view of a GPS tracking device;

FIGS. 3C and 3D illustrate a user interface of the alternative implementation of the GPS tracking device;

FIGS. 9A-F illustrate a process for adding new equipment; and

Like reference symbols in the various drawings indicate like elements.

DETAILED DESCRIPTION

Figure 3A:
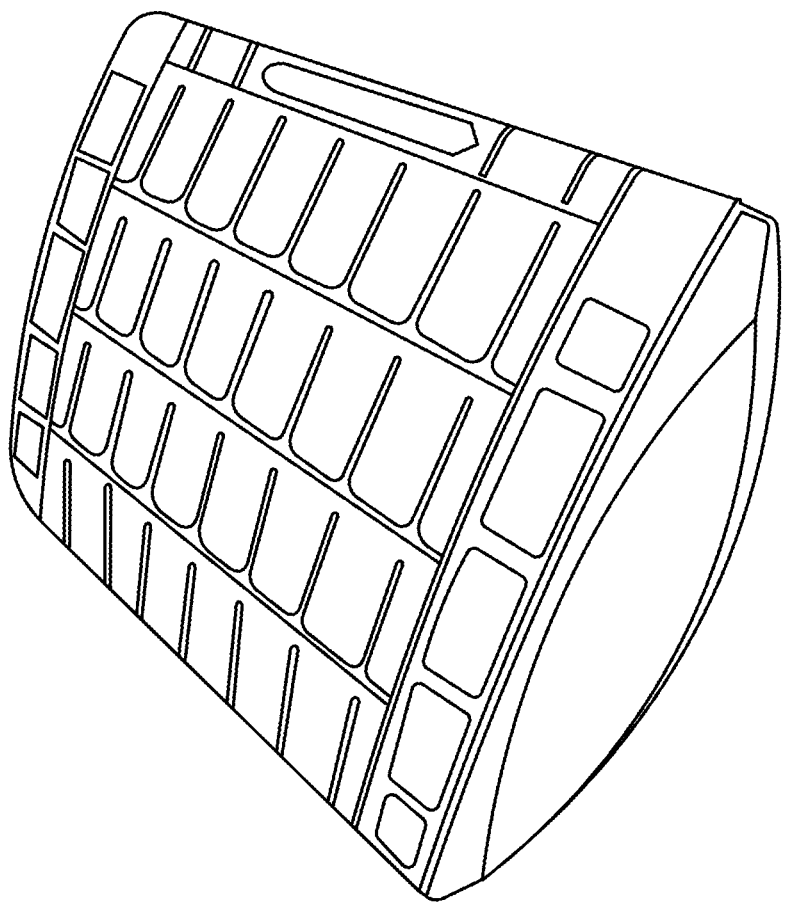
FIGS. 3A and 3B illustrate an alternative implementation of the GPS tracking device.

This document describes a tracking and communication system 10 for locating and managing a fleet of equipment. In preferred implementations, the system 10 includes one or more tracking devices 100, where each tracking device 100 can be mounted to a piece of equipment 101. The piece of equipment 101 can be part of a fleet of equipment, and can include rental watercraft. Examples of such watercraft include, without limitation, jet-skis, wave-runners, sailboats, catamarans, powerboats, cruisers, pontoons, rafts, kayaks, canoes, stand-up-paddleboards, pedal boats, surfboards, wakeboards, yachts, or the like. The tracking device 100 has a transceiver to communicate wirelessly with a communication network 120, such as the Internet. The communication network 120 can include any number of wired or wireless networks, but in preferred implementations, the communication network 120 includes at least one of a cellular communication network, a WIFI communication network, a Bluetooth communication network, or other wireless communication network that communicatively links the tracking device 100 with the Internet.

The tracking device 100 can include a Global Positioning System (GPS) transceiver for receiving and transmitting GPS geo-positioning data from GPS satellites, which geo-positioning data represents a geographical position of the tracking device 100 at a point in time. Examples of a suitable tracking device 100 are described in U.S. patent application Ser. No. 15/067,408, entitled "WATERPROOF WIRELESS COMMUNICATIONS AND METHODS FOR WATER-BASED APPARATUS," filed Mar. 11, 2016, the contents of which are incorporated herein in their entirety for all purposes.

The system 10 can include a client application 110 that can display information (e.g. GPS location) about a number of tracking devices 100. Implementations of the client application software include, but are not limited to, an Android app, an iPhone app, a web page for mobile Internet browsers, a web page for desktop Internet browsers, a Windows based software, and Mac OS based software. The system 10 further includes backend server 130 that processes HTTP requests from both tracking devices and clients, and facilitates a centralized database and a web server.

FIGS. 2A and 2B are mechanical representations of a tracking device 100. In some implementations, the tracking device 100 is a waterproof, solar-powered wireless communication apparatus that can be mounted to a watercraft. FIG. 2A is a perspective view and FIG. 2B is a side cross-section view of a tracking device in accordance with some implementations. The tracking device 100 is formed of a waterproof, transparent enclosure (201) that contains one or more solar panels (202), a number of push buttons 203a and 203b, a number of LED's 204 or other visual indicators, antennas for GPS and wireless communications (205), and a rigid inner enclosure 206 that encloses an electronic circuit, which includes at least one data processor. A bottom of the enclosure can be covered with a fastener 207, such as the Dual Lock™ fastener sold by 3M of St. Paul, Minn. A separate mount 208 comprising of a self-adhesive 3M Dual Lock fastener can be attached to a watercraft (210). This allows the tracking device be easily attached and detached from the watercraft.

The enclosure can be made from a semi-flexible material, and the solar panel and antennas can also be formed to be flexible. This allows the tracking device to be slightly bendable so that it can follow a curved surface of the watercraft 210. A rigid inner enclosure 206 is used to enclose and protect the parts of the electronic circuitry that could easily break if bent or subjected to impact. The tracking device 100 can include a waterproof hatch 209 located on bottom of the enclosure (201). Opening the hatch exposes an electrical port that allows a battery charger to be connected, as well as allowing an external computer to communicate with the tracking device via a data communication port, for example.

The solar panel 202 acts both as a solar panel and as a keypad. This is achieved by placing the push buttons 203b below the solar panel. Since the solar panel is made from thin film flexible material, a user can depress the switches by pressing on top of the solar panel. The transparent top 201 of the enclosure is also flexible. Button indicators 203a, are printed on the solar panel to inform the user where to press. The purpose of this approach is to maximize the surface area of the solar panel since no area is wasted on a separate key pad.

Figure 3B:
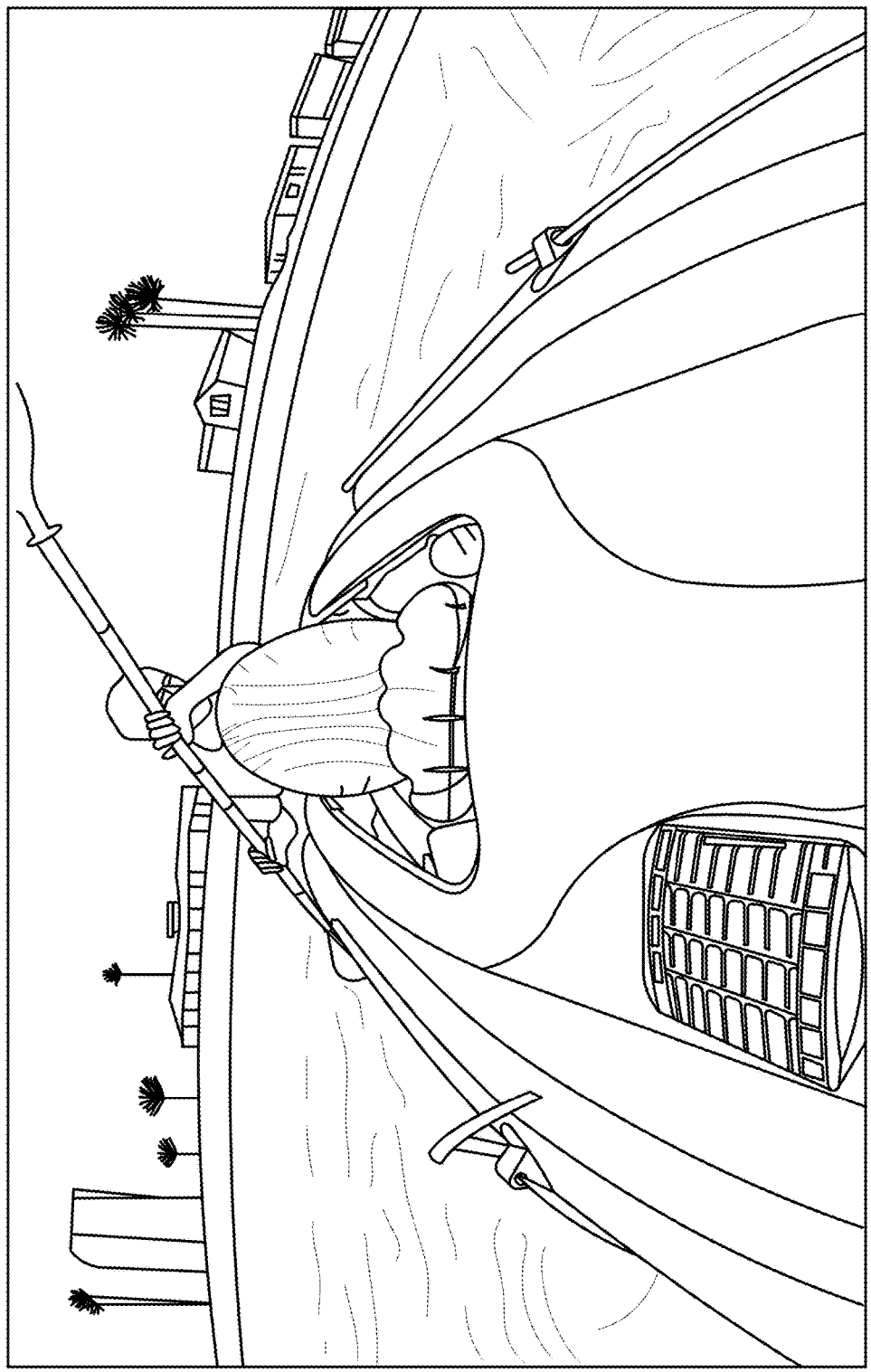

Each tracking device is identified with a unique number ["Tag ID"]. The Tag ID is printed on top of the tracking device. In addition, a QR Code 212 is provided that contains a URL that includes the tag ID, allowing a user to scan the QR code with a mobile phone, and that will launch a web page containing information about the given equipment. The Tag ID can also be provided as an RFID chip. One of the button labels 203a can display a representation of a distress signal, such as "SOS". When depressed, the tracking device will transmit a message to the server indicating that the renter is in an emergency situation. Arrow 211 illustrates a force of water or a wave over the tracking device. However, due to the curved shape of the enclosure or housing of the tracking device, the wave's ability to grab hold of it is heavily reduced FIGS. 3A-3D illustrate an alternative implementation of the GPS tracking device. In this implementation, the buttons and LEDs are placed near the edges of the tracking device, outside of the solar panel area. FIG. 3A shows a photograph of this implementation. FIG. 3B graphically depicts a tracking device attached to a boat. FIG. 3C illustrates the button panel. Buttons 301, 302 and 303 are message buttons. When depressed, they cause the tracking device to send a message to the server, indicating which button was pressed. The specific message that each button represents can be configured on the server, and a self-adhesive sticker or other indication mechanism can be placed on top of the button panel to provide icons or text with a set of alternative messages.

In some preferred implementations, the default messages are:

301—"I'm Ok"—to indicate that the renter is doing well, and has no problems.

302—"I'm Stuck"—to indicate that the renter cannot fully operate the boat, and may need assistance, but without explicitly indicating that the renter is in a state of SOS emergency.

303—"More Time" to indicate that the renter desires to operate the boat for an additional time.

Button 304 is a battery indicator button. When depressed, some LED's will light up to indicate the current battery charge level.

Figure 4:
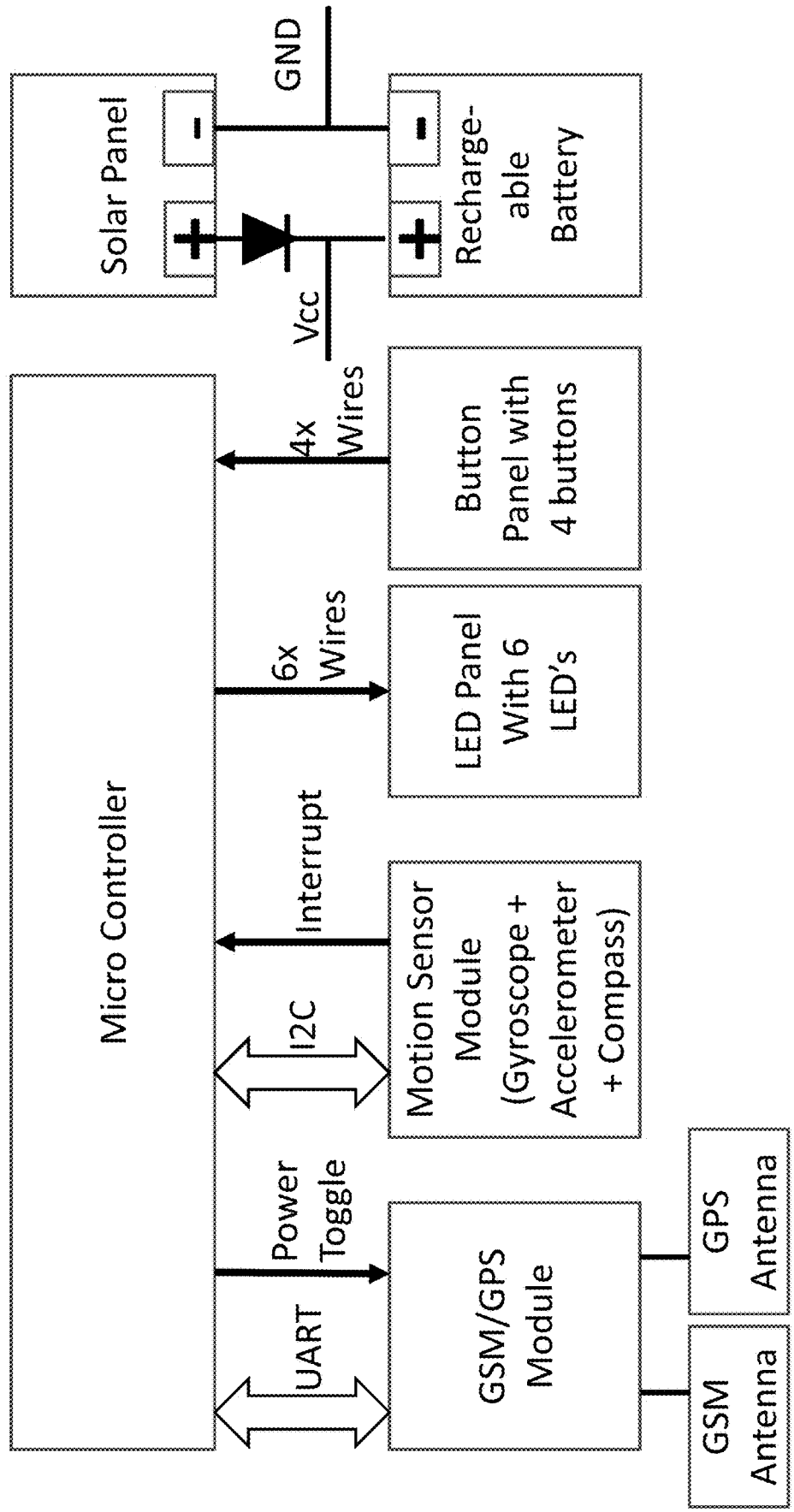
FIG. 4 is a block diagram of the electrical circuitry of the tracking device.

FIG. 3D illustrates the LED panel. LED's 305, 306 and 307 is used to indicate received messages from the server. These LED's are also used to indicate battery level while button 304 is depressed. A number of indication LED's 308, such as a green, a red and a yellow LED, are used to indicate the communication status of the tracking device. In one example, a blinking red light means that the tracking device is currently in the process of obtaining GPS coordinates or communicating with the server. A blinking green light indicates that a communication attempt with the server was successful, and a yellow blinking light indicates an error. FIG. 4 is a block diagram of the electrical circuitry of the tracking device, in accordance with some exemplary implementations described herein.

Figure 5:
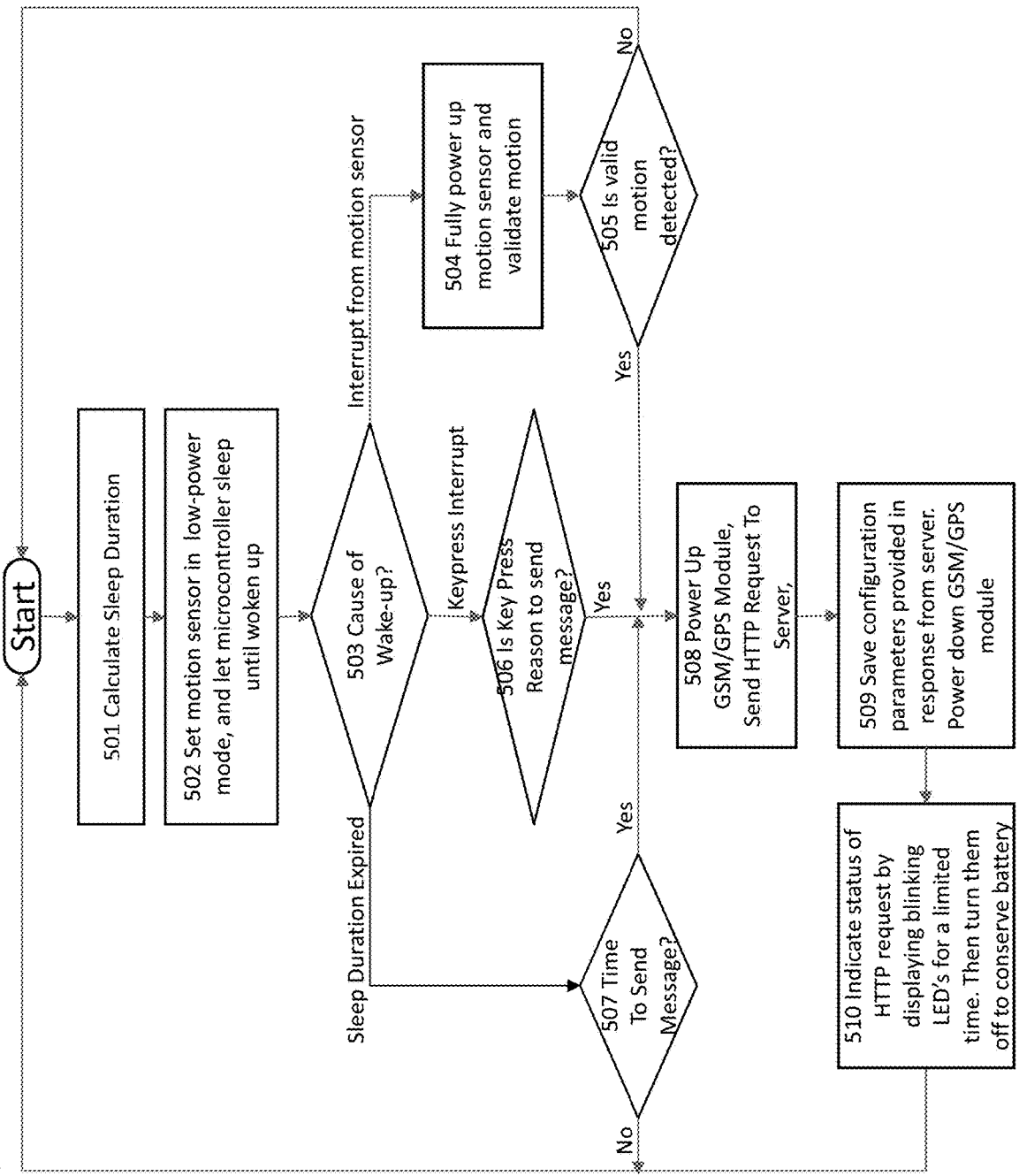
FIG. 5 is a flowchart of a method executed by the tracking device.

FIG. 5 is a flowchart of a method 500 executed by the tracking device, such as by software embedded in a computer processor of the tracking device. The method is configured to send status updates to a server at regular intervals, where each status update contains information about the tracking device, such as GPS location, etc. Upon each status update, the server responds with configuration parameters that controls some behavior of the tracking device. At 501, a sleep time is calculated based the status update interval previously provided by the server. Two or more intervals can be provided—a first interval when the tracking device is still, and another interval if the accelerometer detects a motion. At 502 the microprocessor is powered down, all LED's are turned off, and the motion sensor is put in low-power sleep mode. In this mode, the gyroscope and compass is powered down, but the accelerometer has still the ability to generate interrupts to wake up the microprocessor, if a motion is detected. At 503, the microprocessor is woken up. There are three reasons the microprocessor could be woken up: 1) the pre-set sleep duration time has lapsed, 2) an interrupt is generated by a button key press; and 3) An interrupt is generated by the motion sensor.

At 504 and 505, if a motion is detected, all motion sensors get fully powered up to analyze whether the motion is a reason to transmit a status update. For example, a boat tied to a dock may bob up and down in the water, hence generate motion interrupts. But this by itself may not be a reason to send a status update. However, a boat tied to a dock will not change its orientation very much. By powering up the gyroscope for a certain time period e.g. one minute, and check if the boat never turns more than 45 degree angle within that minute, the motion is classified as invalid, and the microprocessor goes back to sleep. If the boat turns more than 45 degrees, it is assumed that the boat is now being operated, and a status update is transmitted. The exact thresholds used to classify a valid motion are configurable and may differ between different types of equipment. Thresholds for each boat type are determined experimentally and stored on the server, and are downloaded to the tracking device with every status update. The gyroscope can also determine if equipment, such as a boat etc., is capsizing. This works in similar way as described above, except we measure a different axis on the gyroscope (that indicate the tilt of the boat). If the tracking device is mounted close to the engine of a power boat, the accelerometer can determine whether the engine is powered on or not, as the vibration will create a steady stream of acceleration events. By counting number events that is larger than a certain threshold, for a certain time period, we can determine if the engine is running or not. The accelerometer can also detect a collision by measuring if the acceleration exceeds a certain threshold.

At 506, it is determined if a key press is a reason to send a status update. For example, a key press to check battery level would not be reason for a status update. Also, if a message has been sent very recently, a key press with the same message will be ignored. At 507, it is determined if sufficient time has passed since last status update i.e. time slept plus time awake since last status update, exceeds the update interval previously configured by the server. Based on 507, at 508, 509 the system will power up the GPS/GSM module and perform an HTTP request, passing and receiving parameters according to Table 5.1 and Table 5.2 below. At 510, the LED's are made to blink for a limited duration to display the status of the communication and if any messages were received. The LED's will blink only for a limited time to conserve battery. However, if the batter check button is pressed and released, this blinking will resume for another period.

TABLE 5.1

Request Parameters (from tracking device to server)

| Parameter Name | Description |
| --- | --- |
| GPS_Location (GLONASS) | GPS location obtained from GLONASS GPS Receiver |
| GPS_Location (GPRS) | GPS location obtained from GPRS mobile network (cell tower triangulation) |
| Speed | Speed |
| Heading | The direction (in degrees) that the tracking device is moving in |
| Battery level | The battery level of the tracking device |
| Signal strength | The signal strength of the cellular network |
| Key Press | Indicates which keys were pressed |
| Motion Events | Indicates which motion events triggered the status update |

TABLE 5.2

Response Parameters (from server to tracking device)

| Parameter Name | Description |
| --- | --- |
| Message LED's | Determines which of the message LED's should blink (if any) |
| Update Interval Still | Number of seconds between updates (for the case if NO motion events or key press events occur) |
| Update Interval In Motion | Minimum number of seconds between updates (for the case if a valid motion has been detected). |
| GPS Enable | Determines whether to provide satellite GPS coordinates in updates |
| Motion Sensor Enable | Determines whether to use motion sensor |
| Accelerometer Parameters | Parameters passed to accelerometer to set its sensitivity |
| Gyroscope Threshold Turn | Minimum angle (in degrees) a boat needs to turn to be considered in operation, and generate a status update |
| Gyroscope Threshold Capsize | Minimum angle (in degrees) a boat needs to tilt to be considered as capsized |
| Collision Threshold | Accelerometer threshold used to detect collision |
| Power On Threshold | Accelerometer threshold used to detect if boat engine is vibrating |
| Power On Count | Set how many times the power on threshold needs to be exceeded, within a certain time window, to classify the engine as turned on |
| Power On Duration | Sets the time window for the Power On Count. |

Figure 6:
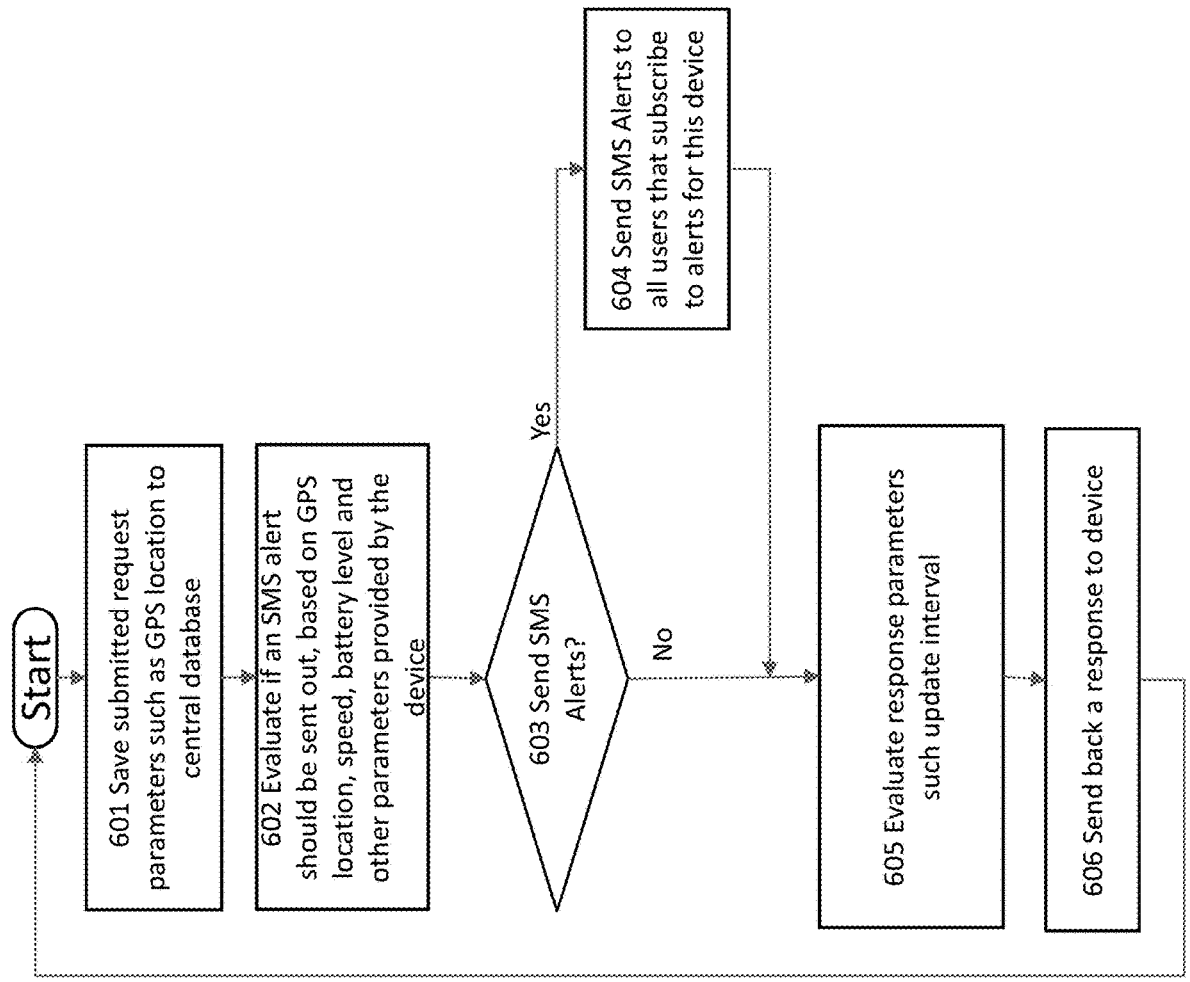
FIG. 6 shows processing a request from a tracking device.

FIG. 6 shows a process of how the server handles an HTTP request from a tracking device. At 601, all request parameters are saved to a central database. At 602 and 603 the system determines whether an SMS alert should be sent out. Table 6.1 below shows a list of SMS alerts, and what cause generates them.

TABLE 6.1

| Alert Name | Cause |
| --- | --- |
| Out-Of-Bounds | When a boat ventures outside the geofence region that determines the allowed boundaries for the boat (how geofence regions are setup is described in a different section) |
| Outing Started | When a boat ventures outside "home" i.e. the geofence region that determines whether the boat is at home (or very close to). |
| Outing Ended | When a boat returns to home |
| Outing Started Before Business Hours | When an outing is started before business hours |
| Outing On-going After Business Hours | When an outing is still on going by the close of business |

TABLE 6.1-continued

| Alert Name | Cause |
| --- | --- |
| Approaching Home | When a boat returns to a geofence region that is designed to indicate that a boat is approaching home. The region is typically set so that staff has time to prepare for the arrival of the boat. |
| Speeding | When the boat exceeds a pre-configured speed limit |
| Capsizing | When the motion sensor detects a capsize event |
| Collision | When the motion sensor detects a capsize event |
| Power On/Off | When the motion sensor detects that engine has turned on or off |
| Low Battery | When reported battery level is below a configurable threshold |
| Stranded | When a boat is in the same location (away from home) for a prolonged duration |
| Not Responding | When a tracking device is not submitting updates at the expected update interval. |
| Foreign Country | When a tracking device connects to a mobile network that belongs to a foreign country. E.g. a boat that has San Diego, USA as its home location, could cause an alert if it travels into Mexico or Canada. |

Figure 7:
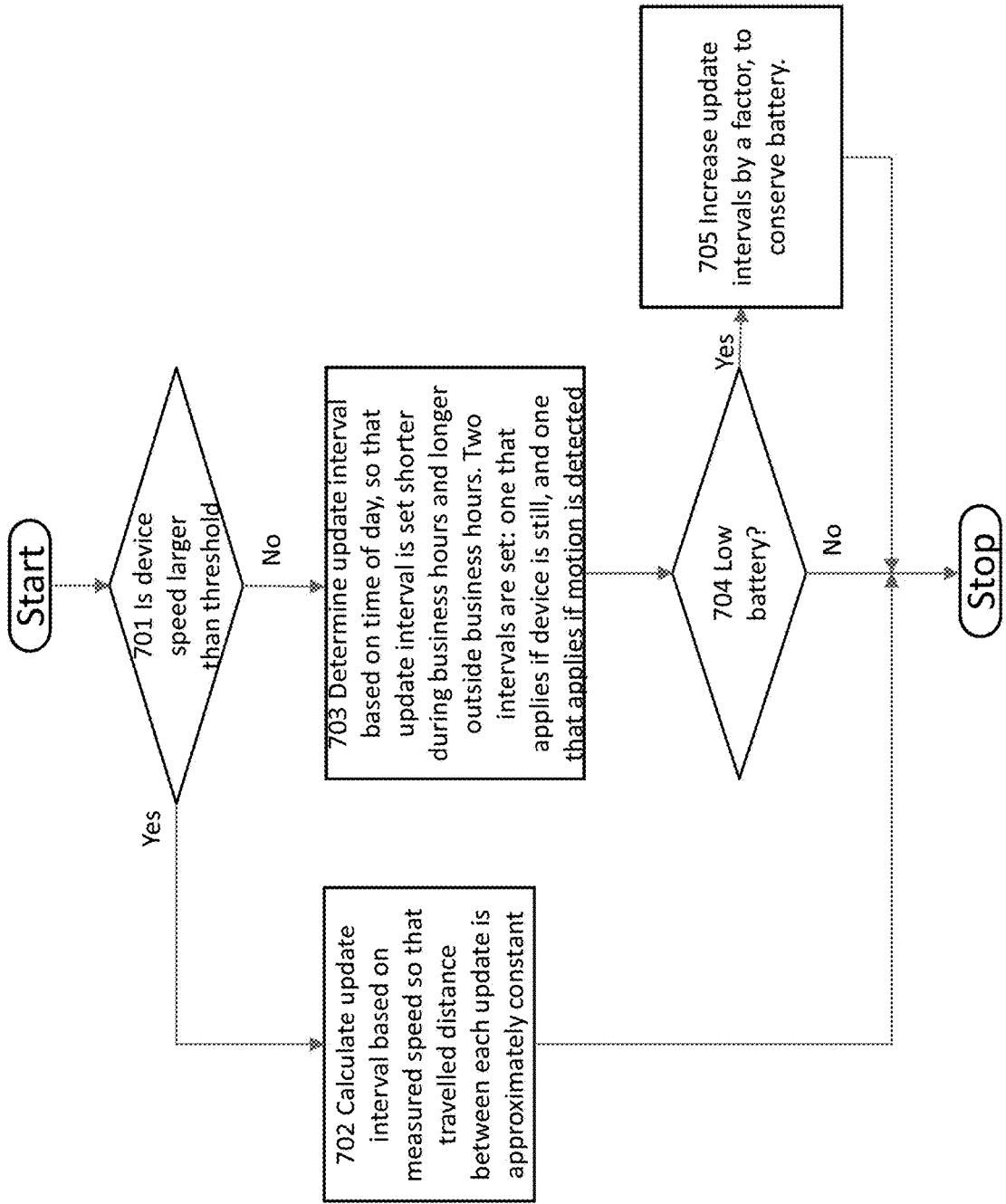
FIG. 7 illustrates a process for calculating update intervals.

At 604, one or more SMS alerts are sent to computing tracking devices associated with all staff members within the rental boat organization that has the SMS alert feature turned on. This is done by sending HTTP requests to a 3rd party SMS service provider. At 605, response parameters (as described in Table 5.2) are calculated. As an example, the update interval calculations are illustrated in FIG. 7. At 606, calculated parameters in the response are returned back to the tracking device.

FIG. 7 illustrates a process for calculating update intervals. At 701, the system determines if a speed of the equipment, based on a speed of the tracking device, is larger than a configurable threshold. At 702, the system calculates an update interval based on the reported speed, so that each update occurs with a fixed travelled distance of the tracking device. The desired distance is configurable. At 703, the update interval is determined based on the time of day. In some implementations, nighttime typically only includes very infrequent updates, compared to during business hours. A period immediately before and immediately after business hours typically have more frequent updates than nighttime, but less frequent than during business hours. At 704, the system checks if a battery level is below a configurable threshold. If low, at 705 the system reduces the update frequency (i.e. increase the interval) to save battery.

FIGS. 8A-8M show screen shots of a mobile client tracking device, such as a smartphone, a tablet computer, a wearable tracking device such as a watch, or other mobile computing tracking device. The client application can also be on a desktop or other non-mobile computing system. FIGS. 8A-8M are specific for boat rentals, and is illustrative only, as the system and methods described thereby can be applied in other applications or industries. FIG. 8A shows the "Equipment Overview" screen which displays GPS markers for all boats that belongs to a certain rental operation. Equipment can be filtered so show only a specified rental location ("site") within the company, or a specific type of boats. Each boat type is identified with its own icon and color. Each marked also has a number used to identify a specific boat. A blue arrow emerging from the base of each marker indicates speed and direction. The arrow gets longer the higher the speed is. When a marker is clicked on, a popup window can emerge to display additional details about the selected boat (as shown with Jet Ski 3 in the FIG. 3B).

Figure 8B:
FIGS. 8A-8M show screen shots of a mobile client tracking device.
Figure 8A:
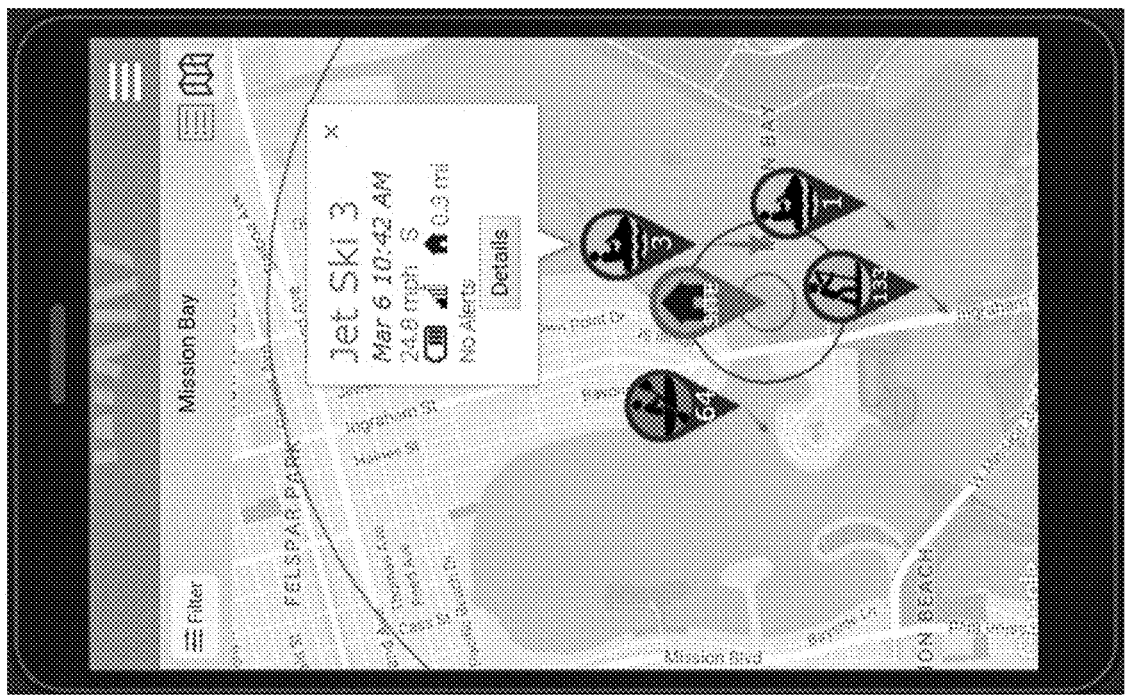

FIG. 8B shows a GPS trace for a given boat. GPS traces are grouped into "outings." Every time a boat leaves the home area, a new outing begins, and then ends when the boat returns to the home area or base. The staff member can click to navigate between older and newer outings, and view the start time, end time and duration for each outing. Oftentimes, knowing the duration of an outing is helpful to determine how much to charge for an equipment rental session. FIG. 8C shows messaging details for a given piece of rental equipment, such as a boat. It has indicators for different types of alerts e.g. key press alerts and motion detect alerts. It also has toggle buttons that allows the staff member to send messages to the boat.

Figure 8D:
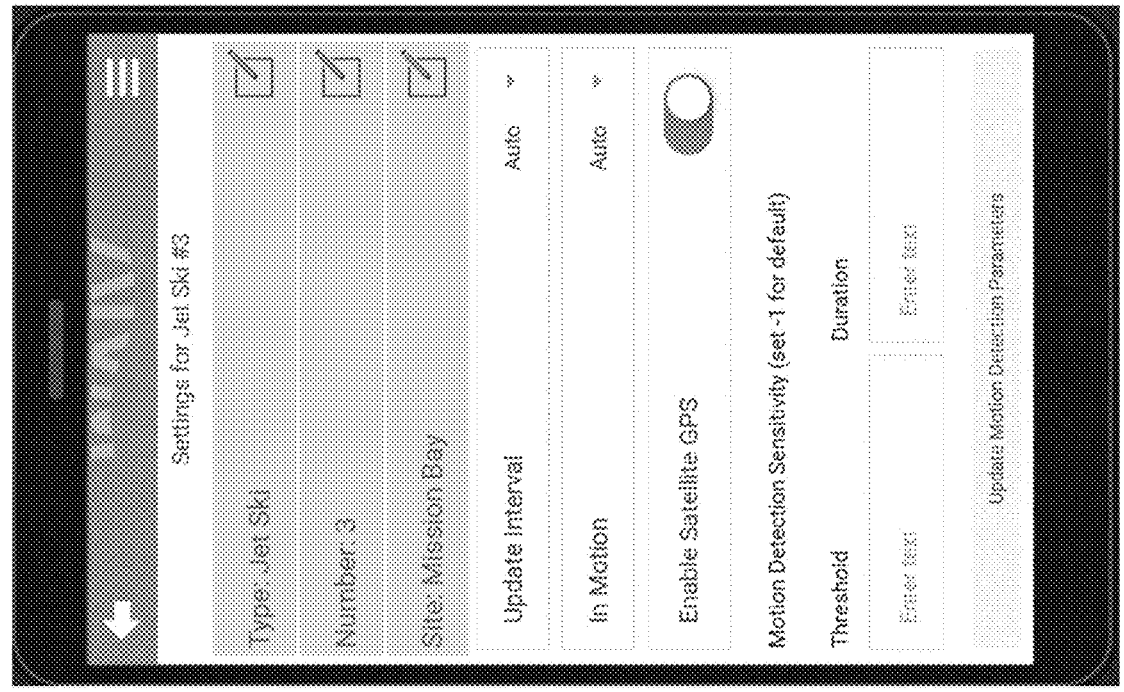
Figure 8C:
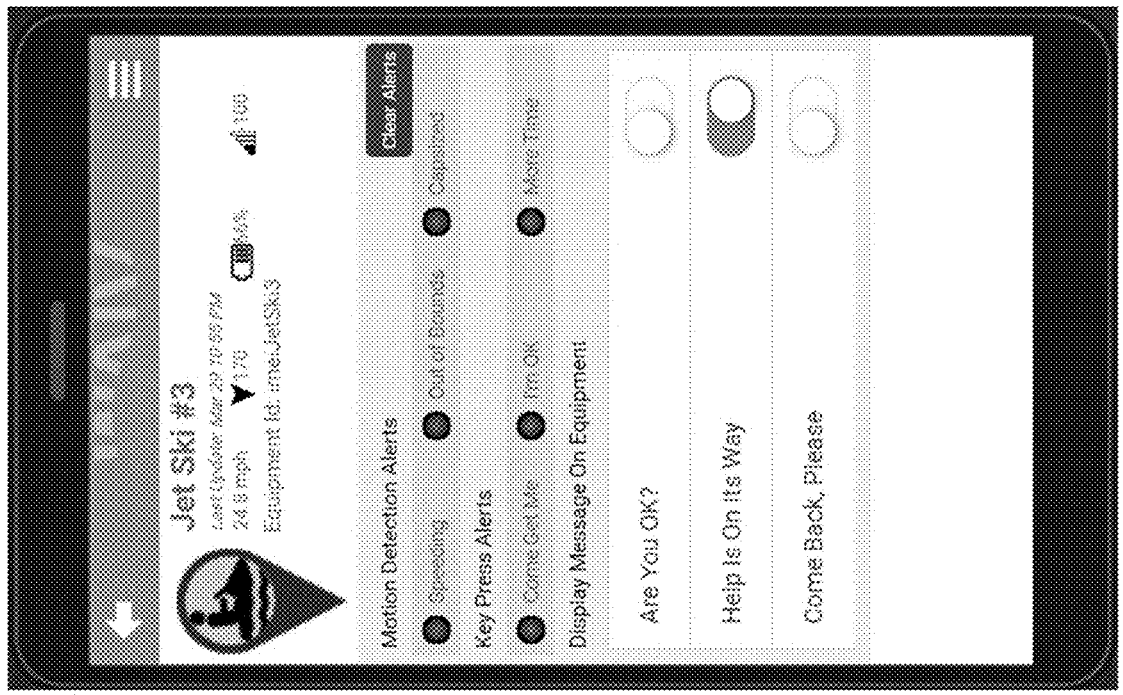
Figure 8F:
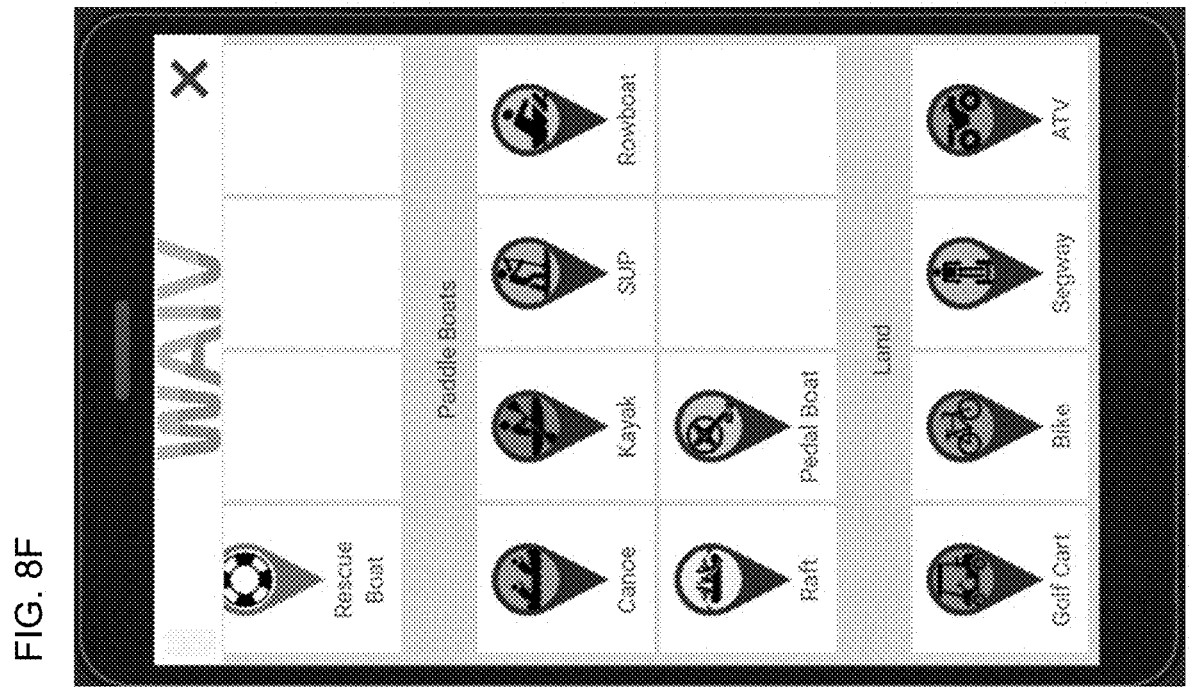
Figure 8E:
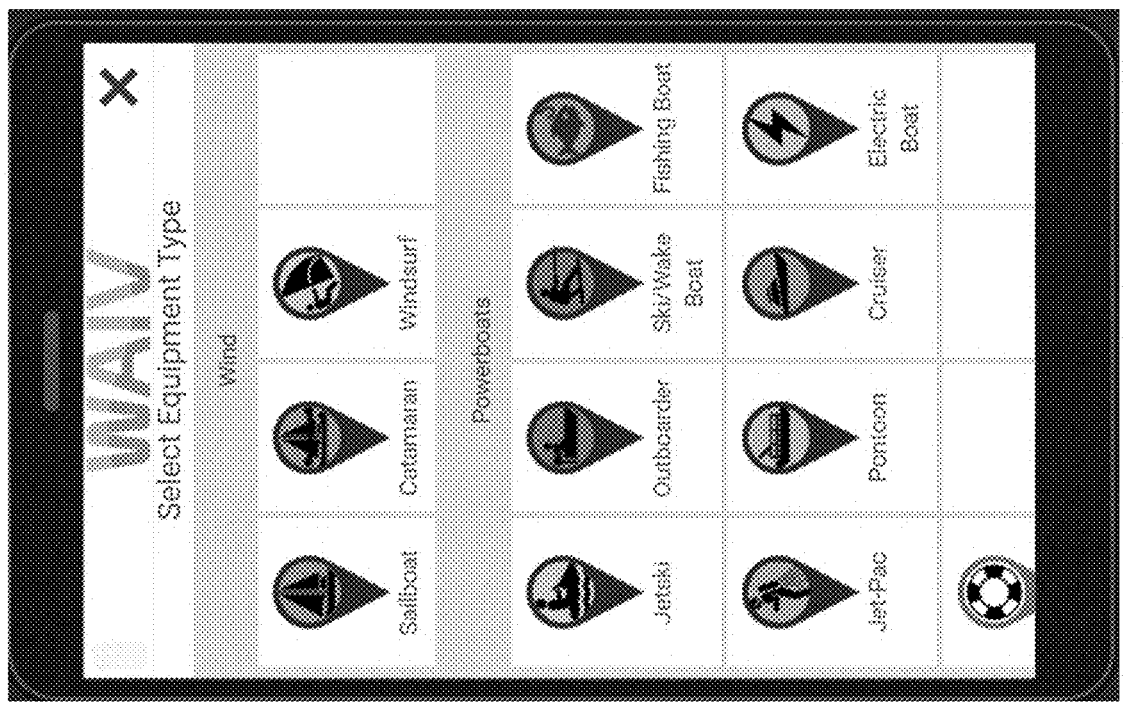
Figure 8G:
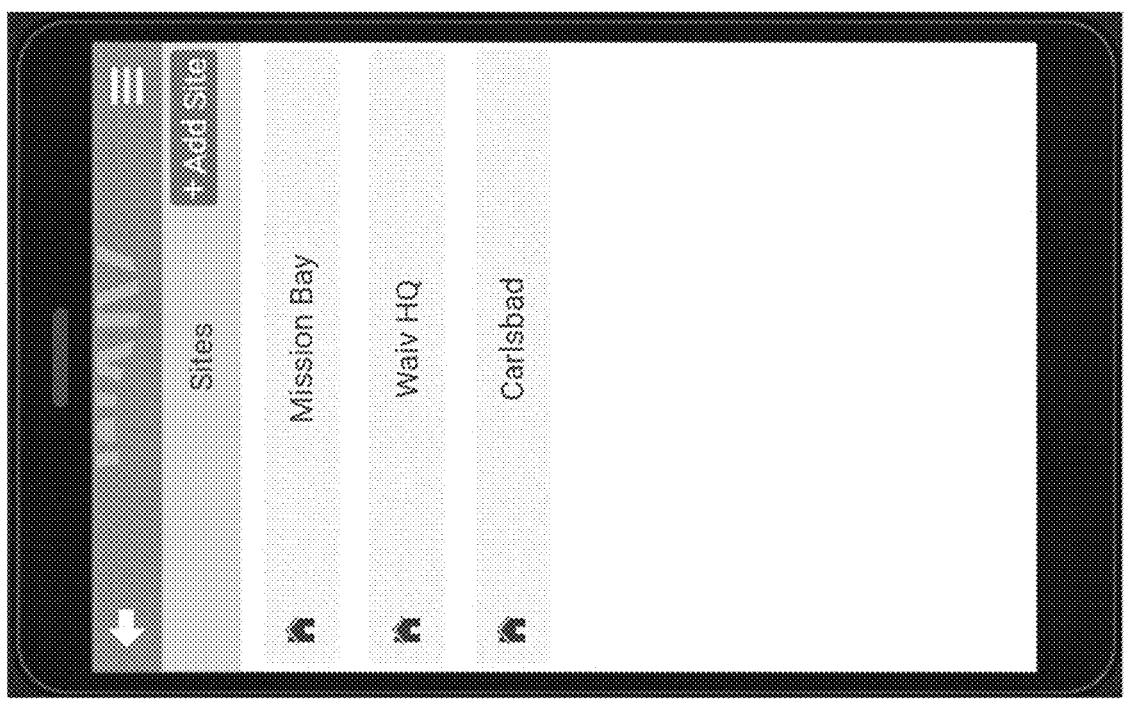
Figure 8I:
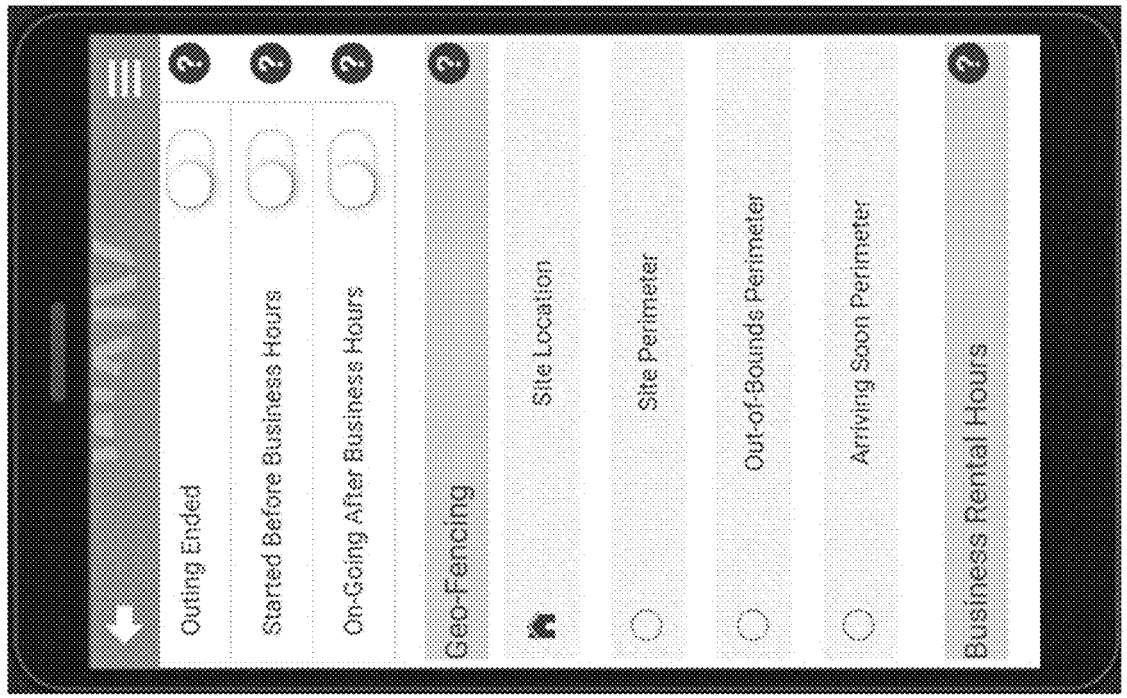
Figure 8H:
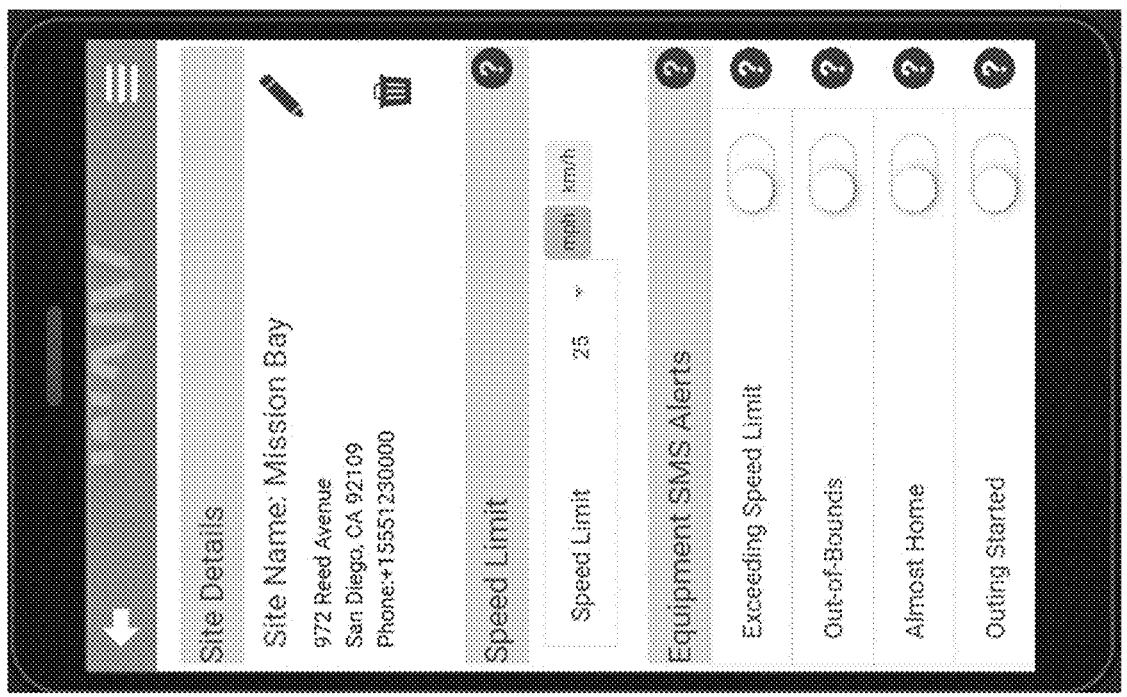
Figure 8K:
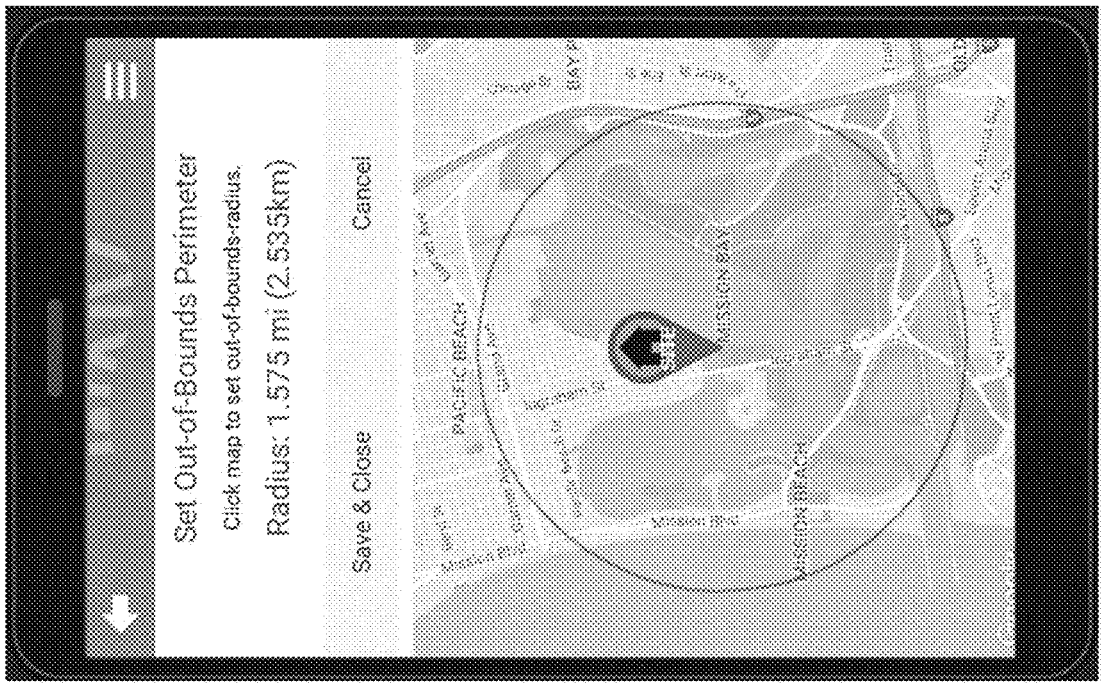
Figure 8J:
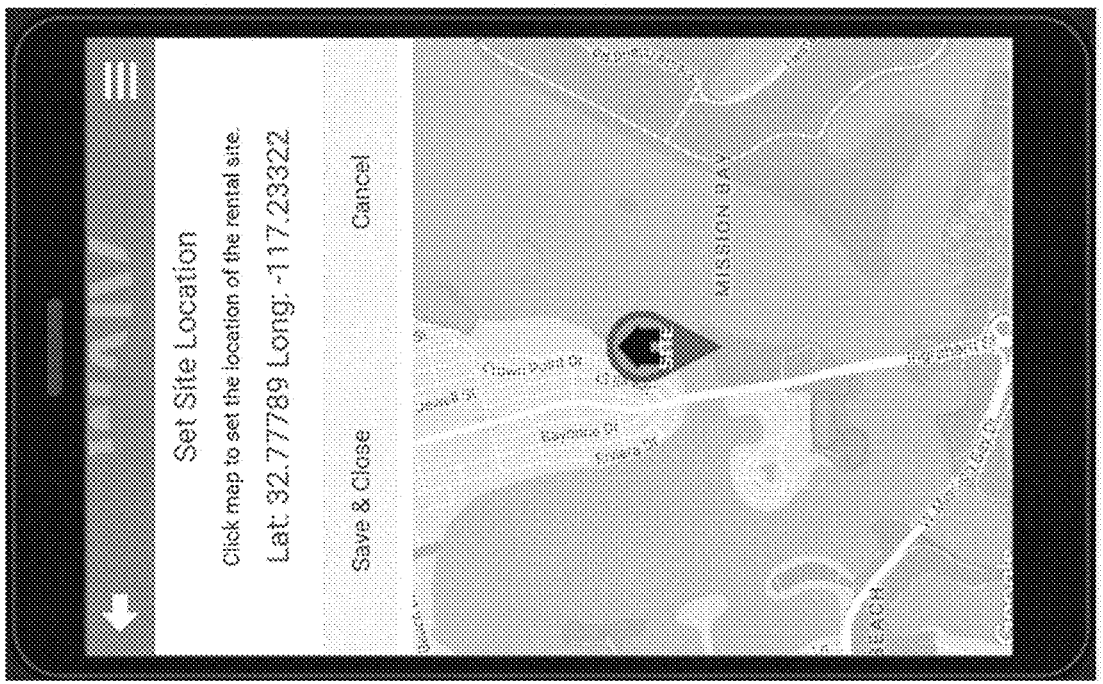
Figure 8M:
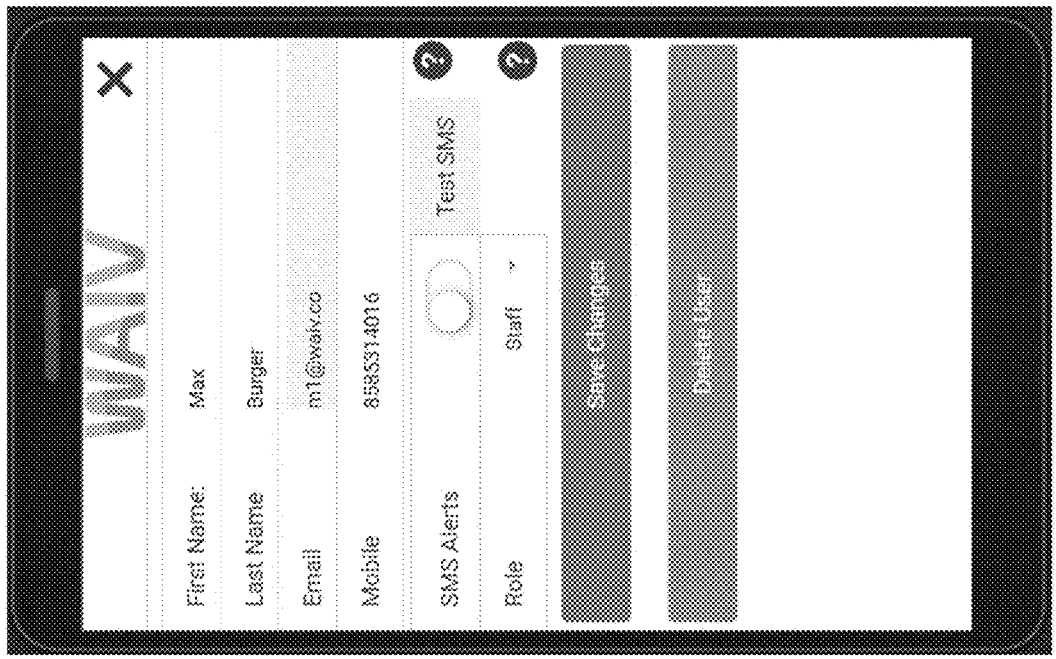
Figure 8L:
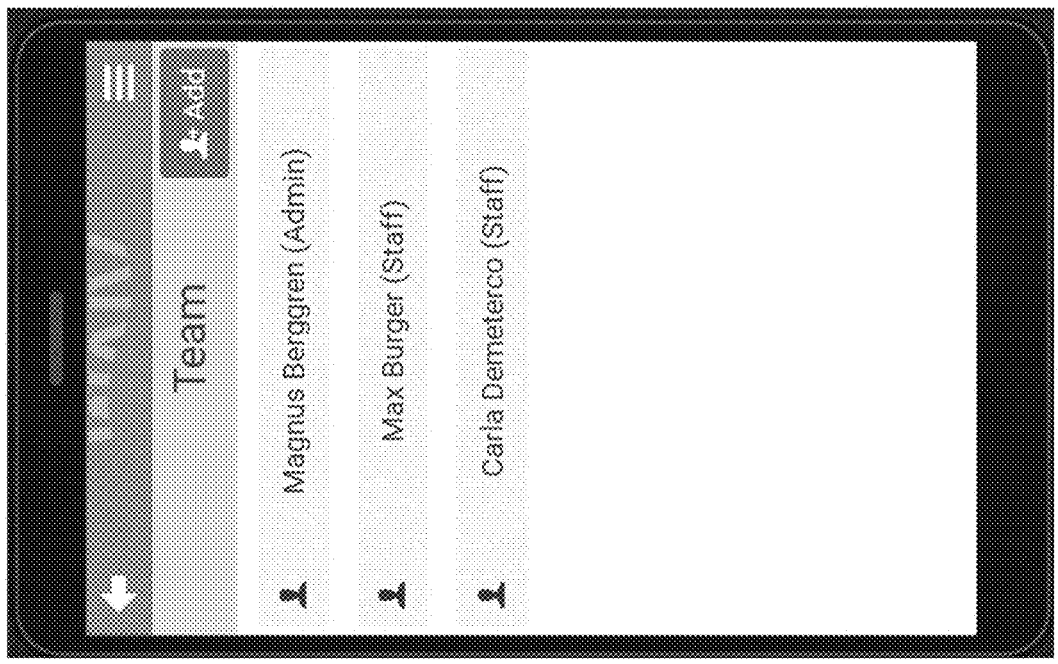

FIG. 8D shows the settings screen where many boat configurations can be set. FIGS. 8E and 8F show the "Set Boat Type" screen, which displays a list of boat types that can be assigned to a tracking device. FIG. 8G shows a "Site List" screen, which displays a list of all rental sites that belong to the given rental business. FIGS. 8H and 8I show a "Site Details" screen, which allow for editing details about a given site, including selecting which alerts should be active for this site. FIG. 8J shows a "Set Site Location" screen, which allows for setting the site location by clicking on the map. FIG. 8K shows a "Set Out-Of-Bounds" screen, which allow for setting the out-of-bounds radius by clicking on the map. The "Set Home Radius" and "Set Approaching Home Radius" screens are not shown, however, as they work in a similar fashion. FIG. 8L shows a "Team Members" screen, which displays a list of staff members of the rental business. FIG. 8M shows a "Team Member Details" screen, which displays details of a given staff member, and has a toggle that determines whether the team member should receive SMS alerts.

Figure 9B:
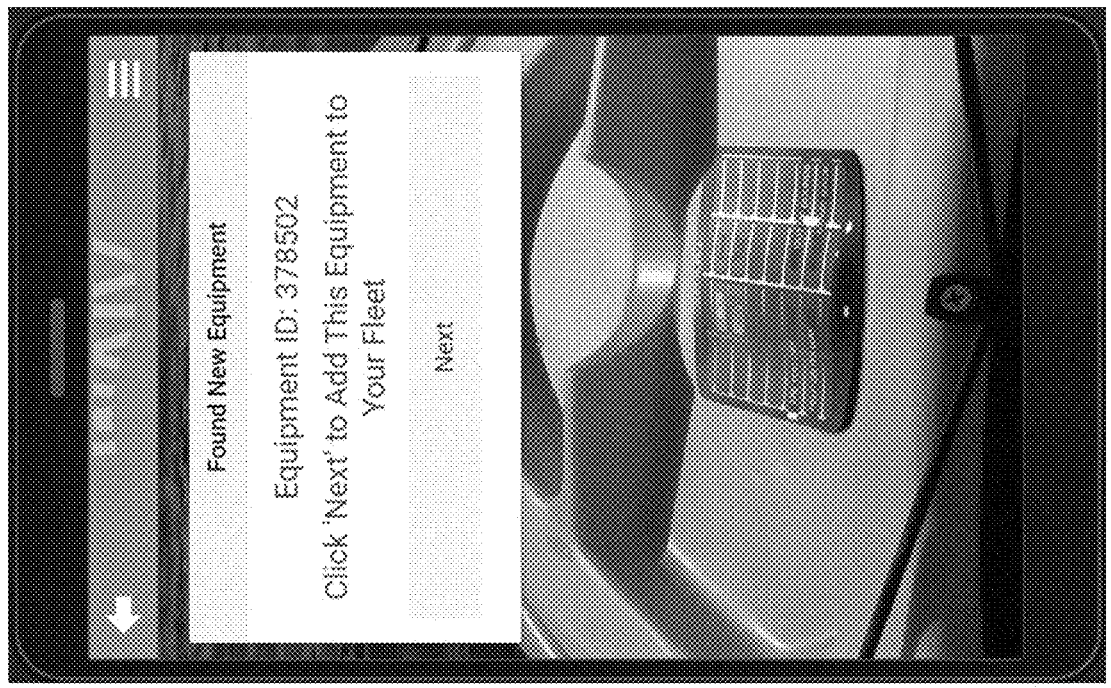
Figure 9A:
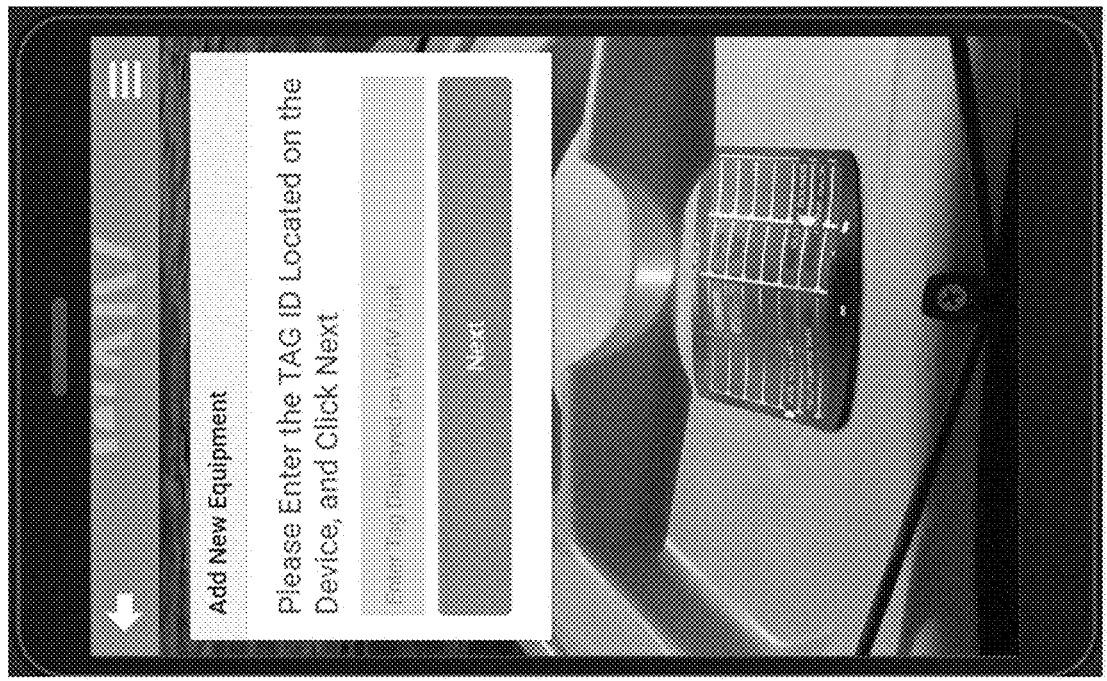

FIGS. 9A-9F illustrate a process for adding new equipment to a fleet, as exemplified by adding a new boat to a boat fleet. The process can be applied to any type of equipment. FIG. 9A shows an "Enter Tag ID" screen, which accepts the unique ID number that is printed on each tracking device. FIG. 9B shows a "Found New Equipment" screen which is shown if an un-registered Tag Id is entered. Clicking "next" will take the user through a "Add New Equipment" wizard display illustrated in FIGS. 9C through 9F. FIG. 9C shows a "Select Type" screen, which allows for selecting the boat type of the new boat.

FIG. 9D allows the user to assign a number to identify the boat. FIG. 9E allows the user to assign the boat to a specific site. FIG. 9F shows a confirmation that the boat was added. In the future, this screen will allow the user to enter credit card information to set up monthly recurring billing of the tracking device.

Figure 10B:
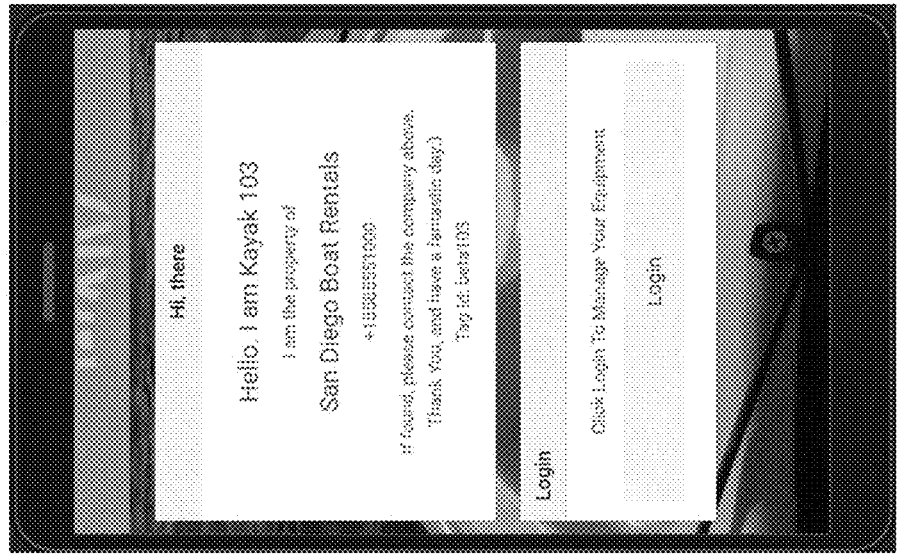
FIGS. 10A and 10B illustrate a process for scanning a code or tag.
Figure 10A:
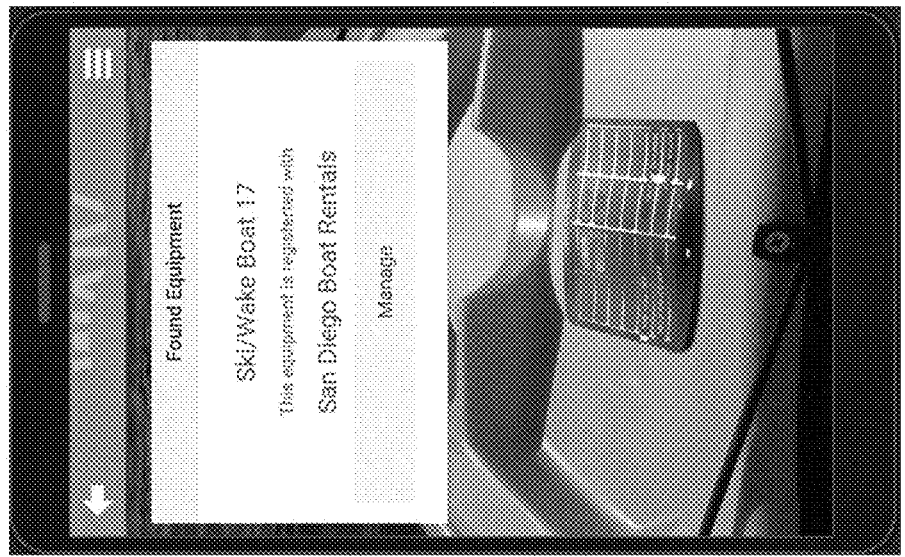

FIGS. 10A and 10B illustrate a process for scanning a code or tag, such as a QR code or an RFID tag. In accordance with some implementations, instead of entering the Tag ID number manually, the user can scan a QR code or RFID tag, to achieve the same result. We use the term "enter a tag ID" to refer to any of those input methods. If a user enters a tag ID on a boat that is already registered, the user will be taken to one of the screens shown in FIGS. 10A and 10B. FIG. 10A shows a "Found My Equipment" screen. This screen is shown if the user that scans the boat is also registered as a team member if the business that owns the boat. A button labelled "Manage" takes the user to the settings screen for the given tracking device, allowing a staff member to quickly update boat type or change other tracking device specific settings. FIG. 10B shows "Lost and Found" screen. This screen is shown if an unaffiliated person e.g. a renter or some random person come across the boat, and scans the tag.

Although the example above related to FIGS. 5-10B is directed to a fleet of boats, the present disclosure and inventive concepts herein can also be applied to a wide variety of other fields or applications. For example, the presently disclosed techniques can be applied to commercial vessels like water taxis, ferries, cargo boats, as well as land based equipment such as bikes, cars, trucks, trailers, trains, trolleys, busses, golf carts, recreational vehicles (RV), all-terrain-vehicles (ATV), snowmobiles, snowboards, skateboards and personal transportation vehicles e.g. Segways®, as well as air-based equipment such as airplanes, drones, kites and paragliding equipment, as well as industrial equipment such as cranes, concrete mixers and other building/road construction machinery, as well as free roaming stock such as cows and sheep, as well as military equipment such as tanks and artillery guns, as well as scientific equipment such as weather buoys, sonars and instruments to measure seismic activity, air-quality, water quality and UV exposure, as well as containers such as cargo containers, and infrastructure such as drawbridges, etc.

Further, the presently disclosed systems and processes can be applied to trash container detection and management. In this implementation, the tracking device is attached to the lid of a trash container. A gyroscope measures the angle of the lid. When the container is overflowing, the lid will not close fully, but will stop at a different angle that is measured by the gyroscope, causing an alert to be sent to the waste management company, informing them that the container needs to be emptied.

Still other implementations can include water well activity detection and management. In this implementation, the tracking device is attached to a moving part on a water well, for example a rotating drum which lifts a bucket up and down, or a pump handle. Motion is measured by the gyroscope and accelerometer to determine when the water well is being used. This is used to gather information about when the well is used. In some drought stricken development countries, this could be used to identify dried-out or malfunctioning wells (since they will be abandoned and no longer operated). This information could then be provided to local authorities, so that they can send repair staff to the well, and direct population to alternative water supplies. The same method can be applied to oil wells, to automate sending a text alert to the owner if the pump stops.

Although a few implementations have been described in detail above, other modifications are possible. Other implementations may be within the scope of the following claims.

The invention claimed is:

1. A system for managing a fleet of rental equipment, each of the rental equipment of the fleet of rental equipment being subject to a rental agreement that represents a duration and/or a geographical limitation for the rental equipment, the system comprising:
 a tracking device for coupling with each of the rental equipment, the tracking device comprising:
  a flexible, waterproof outer enclosure having one or more solar panels for converting solar energy to electricity for the tracking device, the flexible, waterproof outer enclosure further including a coupling feature that releasably couples and conforms the tracking device to an outer surface of the rental equipment;
  a rigid inner enclosure housed by the flexible, waterproof outer enclosure and under the one or more solar panels; and
  a global positioning system (GPS) device embedded in the rigid inner enclosure and being powered by electricity from the one or more solar panels;
  a transceiver embedded in the rigid inner enclosure and being powered by electricity from the one or more solar panels, the transceiver for receiving and transmitting signals to and from a communication network;
  a plurality of message buttons adjacent to the one or more solar panels, each message button being associated with a distinct message and configured to, when depressed, cause a message logic circuitry to generate the distinct message for transmission via the transceiver;
  logic circuitry embedded in the rigid inner enclosure and being powered by electricity from the one or more solar panels, the logic circuitry receiving GPS data from the GPS device and sending the GPS data to the transceiver for transmitting by the transceiver to the communication network, the logic circuitry including the message logic circuitry; and
 a server system executing a fleet management application, the server system receiving the GPS data from the tracking device coupled to the rental equipment via the communication network, and processing the GPS data to generate a set of analytical information representing geographical data associated with the rental equipment during the duration of the rental agreement.

2. The system in accordance with claim 1, further comprising a client application in communication with the server system via the communication network, the client application being configured to graphically represent the analytical information representing the geographical data.

3. The system in accordance with claim 1, wherein the tracking device includes a unique identifier that is transmitted with the GPS data.

4. The system in accordance with claim 1, wherein the GPS data includes one or more of: a distance, a geographical position, a speed, a trajectory, and a duration.

5. The system in accordance with claim 1, wherein the flexible, waterproof outer enclosure bends to follow a curved feature of the outer surface of the rental equipment when releasably coupled to the outer surface of the rental equipment.

6. The system in accordance with claim 1, wherein at least one of the plurality of message buttons is positioned behind at least one of the one or more solar panels, the at least one solar panel being flexible to allow a user to apply a force on the at least one solar panel to depress the at least one message button positioned underneath the at least one solar panel.

7. The system in accordance with claim 6, wherein a button indicator is printed on a top surface of the at least one solar panel thereby indicating a position of the at least one message button positioned underneath.

8. A method of managing a fleet of rental equipment, each of the rental equipment of the fleet of rental equipment being subject to a rental agreement that represents a duration and/or a geographical limitation for the rental equipment, the method comprising:
 associating a tracking device with each of the rental equipment, the tracking device comprising:
  a flexible, waterproof outer enclosure having one or more solar panels for converting solar energy to electricity for the tracking device, the flexible, waterproof outer enclosure further including a coupling feature that releasably couples and conforms the tracking device to an outer surface of the rental equipment;

a rigid inner enclosure housed by the flexible, waterproof outer enclosure; and a global positioning system (GPS) device embedded in the rigid inner enclosure and being powered by electricity from the one or more solar panels;

a transceiver embedded in the rigid inner enclosure and being powered by electricity from the one or more solar panels, the transceiver for receiving and transmitting signals to and from a communication network;

a plurality of message buttons adjacent to the one or more solar panels, each message button being associated with a distinct message and configured to, when depressed, cause a message logic circuitry to generate the distinct message for transmission via the transceiver; and logic circuitry embedded in the rigid inner enclosure and being powered by electricity from the one or more solar panels, the logic circuitry receiving GPS data from the GPS device and sending the GPS data to the transceiver for transmitting by the transceiver to the communication network, the logic circuitry including the message logic circuitry;

receiving, by a server system, the GPS data from the tracking device coupled to the rental equipment via the communication network; and processing, by the server system, the GPS data to generate a set of analytical information representing geographical data associated with the rental equipment during the duration of the rental agreement.

9. The method in accordance with claim 8, further comprising receiving, by a client application in communication with the server system via the communication network, the analytical information; and graphically representing, by the client application on a display, the analytical information representing the geographical data.

10. The method in accordance with claim 8, wherein the tracking device includes a unique identifier that is transmitted with the GPS data.

11. The method in accordance with claim 8, wherein the GPS data includes one or more of: a distance, a geographical position, a speed, a trajectory, and a duration.

12. The method in accordance with claim 8, wherein the flexible, waterproof outer enclosure bends to follow a curved feature of the outer surface of the rental equipment when releasably coupled to the outer surface of the rental equipment.

13. The method in accordance with claim 8, wherein at least one of the plurality of message buttons is positioned behind at least one of the one or more solar panels, the at least one solar panel being flexible to allow a user to apply a force on the at least one solar panel to depress the at least one message button positioned underneath the at least one solar panel.

14. The method in accordance with claim 13, wherein a button indicator is printed on a top surface of the at least one solar panel thereby indicating a position of the at least one message button positioned underneath.

* * * * *